(12) United States Patent
Ho et al.

(10) Patent No.: US 10,727,489 B2
(45) Date of Patent: Jul. 28, 2020

(54) ANODE SLURRY FOR LITHIUM ION BATTERY

(71) Applicant: GRST International Limited, Hong Kong (HK)

(72) Inventors: Kam Piu Ho, Hong Kong (HK); Ranshi Wang, Hong Kong (HK); Peihua Shen, Guangdong (CN)

(73) Assignee: GRST International Limited, Hong Kong (HK)

( * ) Notice: Subject to any disclaimer, the term of this patent is extended or adjusted under 35 U.S.C. 154(b) by 0 days.

(21) Appl. No.: 16/313,944

(22) PCT Filed: Sep. 29, 2017

(86) PCT No.: PCT/CN2017/104248
§ 371 (c)(1),
(2) Date: Dec. 28, 2018

(87) PCT Pub. No.: WO2018/068663
PCT Pub. Date: Apr. 19, 2018

(65) Prior Publication Data
US 2019/0229338 A1 Jul. 25, 2019

Related U.S. Application Data

(60) Provisional application No. 62/406,405, filed on Oct. 11, 2016.

(51) Int. Cl.
*H01M 4/13* (2010.01)
*H01M 4/62* (2006.01)
(Continued)

(52) U.S. Cl.
CPC .......... *H01M 4/622* (2013.01); *H01M 4/133* (2013.01); *H01M 4/1393* (2013.01);
(Continued)

(58) Field of Classification Search
CPC .... H01M 4/133; H01M 4/622; H01M 4/4393; H01M 4/13; H01M 4/139; H01M 10/0525; H01M 2004/021
See application file for complete search history.

(56) References Cited

U.S. PATENT DOCUMENTS

2012/0189913 A1 7/2012 Wakizaka et al.

FOREIGN PATENT DOCUMENTS

| CN | 1819308 A | 8/2006 |
|---|---|---|
| CN | 101154720 A | 4/2008 |

(Continued)

OTHER PUBLICATIONS

International Search Report of PCT Patent Application No. PCT/CN2017/104248 dated Jan. 9, 2018.

(Continued)

*Primary Examiner* — Jane J Rhee

(57) ABSTRACT

Provided herein is a lithium-ion battery anode slurry, comprising: an anode active material, a conductive agent, a binder material, and a solvent, wherein the anode active material has a particle size D50 in the range from about 10 μm to about 40 μm, and wherein the slurry coated onto a current collector having a wet film thickness of about 100 μm has a drying time of about 5 minutes or less under an environment having a temperature of about 60° C. to about 90° C. and a relative humidity of about 25% to about 40%. The anode slurry disclosed herein has homogeneous ingredient dispersion and quick drying capability for making a lithium-ion battery with high quality and consistent performance. In addition, these properties of the anode slurry increase productivity and reduce the cost of manufacturing lithium-ion batteries.

18 Claims, 1 Drawing Sheet

(51) Int. Cl.
  *H01M 4/133* (2010.01)
  *H01M 4/1393* (2010.01)
  *H01M 10/0525* (2010.01)
  *H01M 4/02* (2006.01)
  *H01M 4/139* (2010.01)

(52) U.S. Cl.
  CPC .......... *H01M 10/0525* (2013.01); *H01M 4/13* (2013.01); *H01M 4/139* (2013.01); *H01M 2004/021* (2013.01)

(56) References Cited

FOREIGN PATENT DOCUMENTS

| | | | |
|---|---|---|---|
| CN | 101425605 A | | 5/2009 |
| CN | 101436654 A | | 5/2009 |
| CN | 101499530 A | | 8/2009 |
| CN | 101651227 A | * | 2/2010 |
| CN | 101651227 A | | 2/2010 |
| CN | 101499530 B | * | 5/2011 |
| CN | 102544461 A | | 7/2012 |
| CN | 105149186 A | | 12/2015 |
| EP | 2860802 A1 | | 4/2015 |
| EP | 3176855 A1 | | 6/2017 |
| WO | 2016017066 A1 | | 2/2016 |

OTHER PUBLICATIONS

Search Report of counterpart European Patent Application No. 17860243.9 dated Apr. 8, 2020.

* cited by examiner

ANODE SLURRY FOR LITHIUM ION BATTERY

FIELD OF THE INVENTION

This invention relates to electrode slurries. In particular, this invention relates to an anode slurry for the use in lithium-ion batteries.

BACKGROUND OF THE INVENTION

Lithium-ion batteries (LIBs) have attracted extensive attention in the past two decades for a wide range of applications in portable electronic devices such as cellular phones and laptop computers. Due to rapid market development of electric vehicles (EV) and grid energy storage, high-performance, low-cost LIBs are currently offering one of the most promising options for large-scale energy storage devices.

In general, a lithium ion battery includes a separator, a cathode and an anode. Currently, electrodes are prepared by dispersing fine powders of an active battery electrode material, a conductive agent, and a binder material in an appropriate solvent. The dispersion can be coated onto a current collector such as a copper or aluminum metal foil, and then dried at elevated temperature to remove the solvent. Sheets of the cathode and anode are subsequently stacked or rolled with the separator separating the cathode and anode to form a battery.

Characteristics of electrodes can dramatically affect performance and safety characteristics of battery. Over the last decades, cathode materials have attracted a lot of attention since they affect capacity and energy density of a battery. Anode material is also critical for charging, low temperature and safety performance of batteries. A smooth and uniform coating layer on anodic current collector is less susceptible to dendrite formation, which can extend the cycle life of the cell and enhance the safety of the cell. Therefore, preparation of the anode slurries is an essential first step towards the production of good quality batteries.

Residual solvent in the coating layer due to incomplete drying can contribute to adherence problems which will eventually affect the performance and quality of the batteries. One way to remove residual solvent from an electrode is to dry the electrode for a long period of time under high temperature. However, prolonged heating at high temperature may cause the coating to disintegrate due to aging of polymeric binder. The change of electrode characteristics is detrimental to the proper functioning of the completed battery.

Currently, much research and development is being performed related to electrode slurries. CN Patent Application No. 105149186 A describes a method for drying the electrode coating. The coated electrode is inductively heated by an induction heating coil to heat the metallic current collector to a desired temperature. However, the coated electrode may be non-uniformly heated due to nonuniform distribution of induced current density in the coil. This can create a problem with respect to obtaining rapid heating to a uniform temperature, affecting the quality of the coating.

CN Patent Application No. 102544461 A describes an anode material of a lithium-ion battery. The anode material comprises a crystalline silicon powder, carbon black and binding material. The particle size of the silicon powder is between 2.0 μm and 5.0 μm. However, 15-20 wt. % of binding agent is needed for binding the anode active material and conductive material to the anode current collector because of high specific surface area of the anode active material. A large amount of binding agent in the electrode coating will reduce the energy density of a lithium-ion battery. Furthermore, the resulting anode is required to be dried in a vacuum dryer at high temperature for 12-24 hours. The long time required for drying is considered to be not suitable for large scale production.

CN Patent Application No. 101154720 A describes an anode slurry for lithium-ion battery. The anode slurry is made of a nano-carbon material, a weak acid, a binder and a solvent. The average particle size of the nano-carbon material ranges from 20 nm to 70 nm. However, there is no mention of conditions for drying the coated anode slurry. Furthermore, capacity loss of the battery comprising the anode coated with this anode slurry is 7-15% of its initial capacity after 300 cycles at 1 C/1 C.

In view of the above, there is a need for a continuous improvement of the anode slurries with homogeneous ingredient dispersion and quick drying capability for battery performance and manufacturing efficiency reasons.

SUMMARY OF THE INVENTION

The aforementioned needs are met by various aspects and embodiments disclosed herein.

In one aspect, provided herein is a lithium-ion battery anode slurry, comprising: an anode active material, a conductive agent, a binder material, and a solvent, wherein the anode active material has a particle size D50 in the range from about 10 μm to about 40 μm, and wherein the slurry coated onto a current collector having a wet film thickness of about 100 μm has a drying time of about 5 minutes or less under an environment having a temperature of about 60° C. to about 90° C. and a relative humidity of about 25% to about 40%.

In some embodiments, the anode active material is selected the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the anode active material is present in an amount from 30% to 65% by weight; the conductive agent is present in an amount from 0.8% to 5% by weight; the binder material is present in an amount from 0.5% to 6% by weight; and the solvent is present in an amount from 30% to 60% by weight, wherein the combined weight % value of all components does not exceed 100 wt. %; and wherein all weight % values are based on the total weight of the slurry. In other embodiments, the anode active material is present in an amount from 35% to 50% by weight; the conductive agent is present in an amount from 1% to 4% by weight; the binder material is present in an amount from 0.8% to 3.5% by weight; and the solvent is present in an amount from 40% to 55% by weight, wherein the combined weight % value of all components does not exceed 100 wt. %; and wherein all weight % values are based on the total weight of the slurry.

In some embodiments, the anode active material has a D10 value of at least 3 μm. In certain embodiments, the anode active material has a D90 value of less than or equal to 80 μm. In some embodiments, the ratio D90/D10 of the anode active material is from about 3 to about 10, or from about 5 to about 8.

In certain embodiments, the particle size distribution of the anode active material is bimodal with a first peak at about 12 μm and a second peak at about 30 μm.

In some embodiments, the conductive agent is selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof.

In certain embodiments, the binder material is selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof. In further embodiments, the salt of alginic acid comprises a cation selected from Na, Li, K, Ca, $NH_4$, Mg, Al, or a combination thereof.

In some embodiments, the solvent is selected from the group consisting of N-methyl-2-pyrrolidone, dimethylformamide, dimethyl sulfoxide, acetonitrile, butylene carbonate, propylene carbonate, ethyl bromide, tetrahydrofuran, dimethyl carbonate, diethyl carbonate, ethyl methyl carbonate, methyl propyl carbonate, ethylene carbonate, water, pure water, de-ionized water, distilled water, ethanol, isopropanol, methanol, acetone, n-propanol, t-butanol, and combinations thereof.

In certain embodiments, the solvent has a boiling point of less than 200° C., less than 180° C., less than 160° C., less than 140° C., less than 120° C., or less than 100° C.

In certain embodiments, the viscosity of the slurry is in the range from about 500 mPa·s to about 3,500 mPa·s.

In some embodiments, the vapor pressure of the solvent is at least 15 kPa.

In certain embodiments, the pH of the slurry is from about 7 to about 9.

In some embodiments, the coated slurry film is dried by a box oven, a conveyor oven, or a hot plate.

In some embodiments, the slurry coated onto the current collector in the form of a film has a drying time of about 2.5 minutes or less.

In another aspect, provided herein is a negative electrode for a lithium-ion battery, the negative electrode comprising: a negative current collector and a negative electrode layer dispersed on the negative current collector, wherein the negative electrode layer is formed using the anode slurry prepared by the method disclosed herein.

In another aspect, provided herein is a lithium-ion battery comprising: a cathode, an anode and a separator interposed between the cathode and the anode, wherein at least one of the anode is the negative electrode prepared by the method disclosed herein.

DETAILED DESCRIPTION OF THE INVENTION

General Definitions

Figure 1:
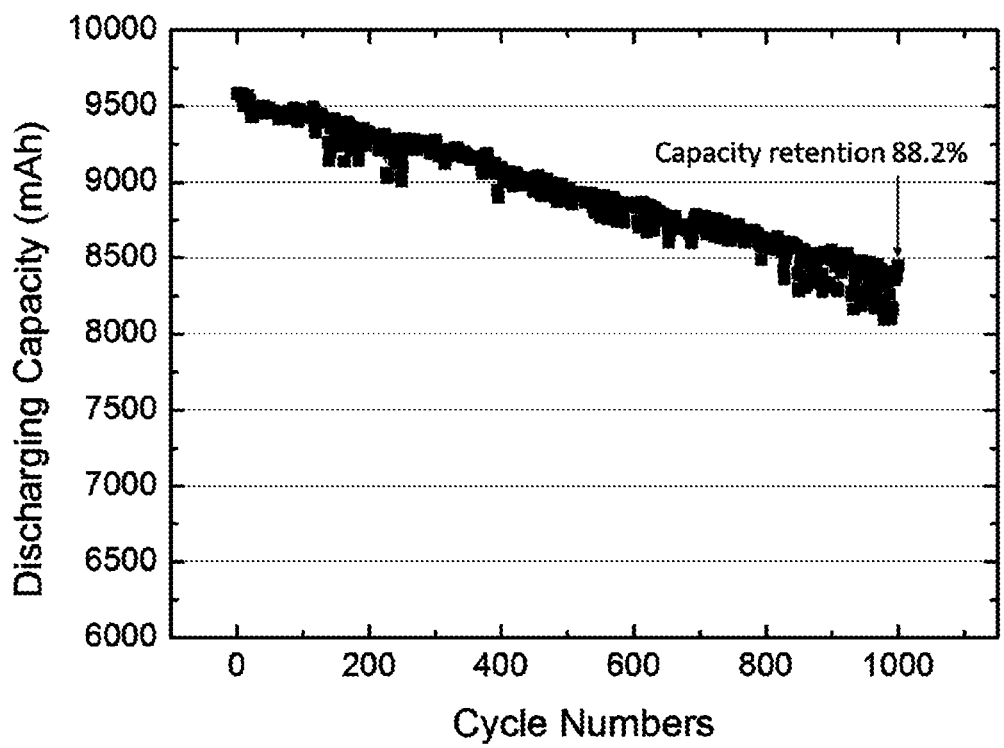
FIG. 1 depicts cycling performance for electrochemical cell containing cathode and anode prepared by Example 3.

The term "conductive agent" refers to a chemical or a substance that increases the electrical conductivity of an electrode.

The term "binder material" refers to a chemical or a substance that can be used to hold the active battery electrode material and conductive agent in place.

The term "applied" or "applying" refers to an act of laying or spreading a layer of slurry on a surface of the current collector.

The term "current collector" refers to a support for coating the active battery electrode material and a chemically inactive high electron conductor for keeping an electric current flowing to electrodes during discharging or charging a secondary battery.

The term "still air" refers to the air surrounding the coating being substantially motionless. In the absence of air flow, a wind speed of less than 0.2 m/s was observed at a position 1 cm above the top surface of the coating surface. In some embodiments, the wind speed is less than 0.1 m/s. In certain embodiments, the wind speed is 0 m/s.

The term "major component" of a composition refers to the component that is more than 50%, more than 55%, more than 60%, more than 65%, more than 70%, more than 75%, more than 80%, more than 85%, more than 90%, or more than 95% by weight or volume, based on the total weight or volume of the composition.

The term "minor component" of a composition refers to the component that is less than 50%, less than 45%, less than 40%, less than 35%, less than 30%, less than 25%, less than 20%, less than 15%, less than 10%, or less than 5% by weight or volume, based on the total weight or volume of the composition.

The term "homogenizer" refers to an equipment that can be used for homogenization of materials. The term "homogenization" refers to a process of reducing a substance or material to small particles and distributing it uniformly throughout a fluid. Any conventional homogenizers can be used for the method disclosed herein. Some non-limiting examples of the homogenizer include stirring mixers, blenders, mills (e.g., colloid mills and sand mills), ultrasonicators, atomizers, rotor-stator homogenizers, and high pressure homogenizers.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or the full energy in 10 hours; and a 5 C means utilization of the full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3,600 coulombs of electrical charge. Similarly, the term "miniampere-hour (mAh)" also refers to a unit of the storage capacity of a battery and is $1/1,000$ of an ampere-hour.

The term "battery cycle life" refers to the number of complete charge/discharge cycles a battery can perform before its nominal capacity falls below 80% of its initial rated capacity.

The term "doctor blading" refers to a process for fabrication of large area films on rigid or flexible substrates. A coating thickness can be controlled by an adjustable gap width between a coating blade and a coating surface, which allows the deposition of variable wet layer thicknesses.

The term "transfer coating" or "roll coating" refers to a process for fabrication of large area films on rigid or flexible substrates. A slurry is applied on the substrate by transferring a coating from the surface of a coating roller with pressure. A coating thickness can be controlled by an adjustable gap width between a metering blade and a surface of the coating roller, which allows the deposition of variable wet layer thicknesses. In a metering roll system, the thickness of the coating is controlled by adjusting the gap between a metering roller and a coating roller.

The term "particle size D50" refers to a volume-based accumulative 50% size (D50) which is a particle size at a point of 50% on an accumulative curve (i.e., a diameter of a particle in the 50th percentile (median) of the volumes of particles) when the accumulative curve is drawn so that a particle size distribution is obtained on the volume basis and the whole volume is 100%. Further, with respect to the anode active material of the present invention, the particle size D50 means a volume-averaged particle size of secondary particles which are formed by mutual agglomeration and sintering of primary particles, and in a case where the particles are composed of the primary particles only, it means a volume-averaged particle size of the primary particles. Furthermore, D10 means a volume-based accumulative 10% size (i.e., a diameter of a particle in the 10th percentile of the volumes of particles), and D90 means a volume-based accumulative 90% size (i.e., a diameter of a particle in the 90th percentile of the volumes of particles).

The term "vapor pressure" of a fluid refers to the pressure exerted by the vapor of that fluid with the liquid phase in thermodynamic equilibrium at a given temperature in a closed system.

The term "solid content" refers to the amount of nonvolatile material remaining after evaporation.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Provided herein is a lithium-ion battery anode slurry, comprising: an anode active material, a conductive agent, a binder material, and a solvent, wherein the anode active material has a particle size D50 in the range from about 10 μm to about 40 μm, and wherein the slurry coated onto a current collector having a wet film thickness of about 100 μm has a drying time of about 5 minutes or less under an environment having a temperature of about 60° C. to about 90° C. and a relative humidity of about 25% to about 40%.

Conventionally, in order to achieve a higher packing density of an anode, anode active material having a smaller particle size is preferred. Generally, the average particle size of the anode active material is preferred being in the range of 0.05 μm to 5 μm. An electrode in which anode active materials of different particle diameters are included has also been used as an anode for a lithium secondary battery. Accordingly, the spaces between the large diameter particles are filled with the small diameter particles. However, a dense coating will retard evaporation of solvent from the interior of the coating. The curing steps of current processes are time consuming. The drying time can be shortened upon exposure to high temperatures. However, this often leads to poor electrode quality and significantly poorer cell performance because of nonuniform drying. In other words, a slurry comprising an anode active material having particles with a particular range of particle size and size ratio that allows a relatively high drying rate has not been developed, and a slurry capable of high processability is desired. Therefore, there is always a need for a new anode slurry that is simple, reliable and cost-effective to be used for making a lithium ion battery with high quality and consistent performance.

In some embodiments, the anode active material is selected from the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ (LTO) particulate, Si particulate, Si—C composite particulate, and combinations thereof.

In certain embodiments, the anode active material is doped with a metallic element or a nonmetal element. In some embodiments, the metallic element is selected from the group consisting of Fe, Ni, Mn, Al, Mg, Zn, Ti, La, Ce, Sn, Zr, Ru and combinations thereof. In some embodiments, the nonmetal element is B, Si, Ge, N, P, F, S, Cl, I, Se and combinations thereof.

In some embodiments, the anode active material comprises or is a core-shell composite having a core and shell structure, wherein the core and the shell each is independently selected from the group consisting of natural graphite particulate, synthetic graphite particulate, hard carbon, soft carbon, mesocarbon microbeads (MCMB), Sn particulate, $SnO_2$, SnO, $Li_4Ti_5O_{12}$ particulate, Si particulate, Si—C composite particulate, and combinations thereof.

In certain embodiments, the core-shell composite comprises a core comprising a carbonaceous material and a shell coated on the carbonaceous material core. In some embodiments, the carbonaceous material is selected from the group consisting of soft carbon, hard carbon, natural graphite particulate, synthetic graphite particulate, mesocarbon microbeads, Kish graphite, pyrolytic carbon, mesophase pitches, mesophase pitch-based carbon fiber, and combinations thereof. In certain embodiments, the shell is selected from the group consisting of natural graphite particulate, synthetic graphite particulate, hard carbon, soft carbon, mesocarbon microbeads, Sn particulate, $SnO_2$, SnO, $Li_4Ti_5O_{12}$ particulate, Si particulate, Si—C composite particulate, and combinations thereof.

In some embodiments, the diameter of the core is from about 5 μm to about 35 μm, from about 5 μm to about 25 μm, from about 5 μm to about 15 μm, from about 10 μm to about 30 μm, or from about 10 μm to about 25 μm. In certain embodiments, the thickness of the shell is from about 15 μm to about 35 μm, from about 15 μm to about 20 μm, from about 15 μm to about 25 μm, from about 20 μm to about 30 μm, or from about 20 μm to about 35 μm.

In some embodiments, the diameter or thickness ratio of the core and the shell are in the range of 15:85 to 85:15, 25:75 to 75:25, 30:70 to 70:30, or 40:60 to 60:40. In certain embodiments, the volume or weight ratio of the core and the shell is 80:20, 70:30, 60:40, 50:50, 40:60, or 30:70.

In certain embodiments, the anode active material is not doped with a metallic element or a nonmetal element. In some embodiments, the anode active material is not doped with Fe, Ni, Mn, Al, Mg, Zn, Ti, La, Ce, Sn, Zr, Ru, B, Si, Ge, N, P, F, S, Cl, I, or Se.

If the particle diameter D50 of the anode active material is larger than about 10 μm, there will be space created between the large diameter particles in the coated film on the current collector, allowing effective drying of the coated film in a short period of time. In some embodiments, the anode active material of the present invention has a particle size D50 in the range from about 10 μm to about 40 μm, from about 10 μm to about 35 μm, from about 10 μm to about 30 μm, from about 10 μm to about 25 μm, from about 15 μm to about 45 μm, from about 15 μm to about 30 μm, from about 15 μm to about 25 μm, from about 15 μm to about 20 μm, from about 20 μm to about 40 μm, from about 20 μm to about 30 μm, from about 25 μm to about 40 μm, or from about 30 μm to about 40 μm.

In certain embodiments, the particle diameter D50 of the anode active material is less than 40 μm, less than 35 μm, less than 30 μm, less than 25 μm, less than 20 μm, or less than 15 μm. In some embodiment, the particle diameter D50 of the anode active material is greater than 10 μm, greater than 15 μm, greater than 20 μm, greater than 25 μm, greater than 30 μm, or greater than 35 μm. In certain embodiments, the particle diameter D50 of the anode active material is about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, or about 40 μm, In certain embodiments, the anode active material has a particle size D10 from about 3 μm to about 20 μm, from about 3 μm to about 10 μm, from about 3 μm to about 8 μm, from about 1 μm to about 10 μm, from about 1 μm to about 8 μm, from about 1 μm to about 5 μm, from about 2 μm to about 10 μm, from about 2 μm to about 5 μm, or from about 2 μm to about 8 μm.

In some embodiments, the anode active material has a particle size D90 from about 20 μm to about 70 μm, from about 30 μm to about 87 μm, from about 40 μm to about 70 μm, from about 50 μm to about 70 μm, from about 30 μm to about 60 μm, from about 30 μm to about 50 μm, from about 20 μm to about 40 μm, from about 20 μm to about 50 μm, or from about 40 μm to about 50 μm.

In certain embodiments, the ratio D90/D10 of the anode active material is from about 3 to about 15, from about 3 to about 10, from about 3 to about 8, from about 5 to about 15, from about 5 to about 10, from about 5 to about 8, from about 7.5 to about 20, from about 10 to about 20, or from about 10 to about 15.

In some embodiments, the amount of the anode active material is from about 10% to about 80%, from about 10% to about 70%, from about 10% to about 60%, from about 10% to about 50%, from about 10% to about 40%, from about 10% to about 30%, from about 10% to about 20%, from about 30% to about 70%, from about 30% to about 60%, from about 30% to about 50%, from about 30% to about 40%, from about 40% to about 70%, from about 40% to about 60%, from about 40% to about 50%, from about 45% to about 50%, from about 25% to about 60%, from about 25% to about 50%, from about 25% to about 40%, from about 35% to about 65%, from about 35% to about 50%, or from about 35% to about 45% by weight or volume, based on the total weight or volume of the slurry. In certain embodiments, the amount of the anode active material is at least 10%, at least 15%, at least 20%, at least 25%, at least 27.5%, at least 30%, at least 32.5%, at least 35%, at least 37.5%, at least 40%, at least 42.5%, at least 45%, at least 47.5%, at least 50%, at least 52.5%, at least 55%, at least 57.5, or at least 60% by weight or volume, based on the total weight or volume of the slurry. In certain embodiments, the amount of the anode active material is at most 25%, at most 27.5%, at most 30%, at most 32.5%, at most 35%, at most 37.5%, at most 40%, at most 42.5%, at most 45%, at most 47.5%, at most 50%, at most 52.5%, at most 55%, at most 57.5%, or at most 60% by weight or volume, based on the total weight or volume of the slurry. In some embodiments, the amount of the anode active material is about 40%, about 41%, about 42%, about 43%, about 44%, about 45%, about 46%, about 47%, about 48%, about 49%, about 50%, about 51%, about 52%, about 53%, about 54%, or about 55% by weight or volume, based on the total weight or volume of the slurry.

The conductive agent in the slurry is for enhancing the electrical conductivity of an anode. In some embodiments, the conductive agent is selected from the group consisting of carbon, carbon black, graphite, expanded graphite, graphene, graphene nanoplatelets, carbon fibres, carbon nanofibers, graphitized carbon flake, carbon tubes, carbon nanotubes, activated carbon, mesoporous carbon, and combinations thereof. In certain embodiments, the conductive agent is not carbon, carbon black, graphite, expanded graphite, graphene, graphene nanoplatelets, carbon fibres, carbon nano-fibers, graphitized carbon flake, carbon tubes, carbon nanotubes, activated carbon, or mesoporous carbon.

In some embodiments, the particle size of conductive agent is from about 10 nm to about 100 nm, from about 10 nm to about 50 nm, from about 10 nm to about 45 nm, from about 10 nm to about 40 nm, from about 10 nm to about 35 nm, from about 10 nm to about 30 nm, from about 10 nm to about 25 nm, from about 10 nm to about 20 nm, from about 10 nm to about 15 nm, from about 20 nm to about 50 nm, from about 20 nm to about 40 nm, from about 25 nm to about 50 nm, from about 30 nm to about 50 nm, or from about 30 nm to about 40 nm.

In some embodiments, the binder material is selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof. In further embodiments, the salt of alginic acid comprises a cation selected from Na, Li, K, Ca, NH$_4$, Mg, Al, or a combination thereof.

In certain embodiments, the binder material is selected from the group consisting of styrene-butadiene rubber, carboxymethyl cellulose, polyvinylidene fluoride, acrylonitrile copolymer, polyacrylic acid, polyacrylonitrile, poly(vinylidene fluoride)-hexafluoropropene, latex, a salt of alginic acid, and combinations thereof.

In some embodiments, the binder material is selected from SBR, CMC, PAA, a salt of alginic acid, or a combination thereof. In certain embodiments, the binder material is acrylonitrile copolymer. In some embodiments, the binder material is polyacrylonitrile. In certain embodiments, the binder material is free of styrene-butadiene rubber, carboxymethyl cellulose, polyvinylidene fluoride, acrylonitrile copolymer, polyacrylic acid, polyacrylonitrile, poly(vinylidene fluoride)-hexafluoropropene, latex, or a salt of alginic acid.

In certain embodiments, the amount of each of the conductive agent and binder material is independently at least 0.1%, at least 0.25%, at least 0.5%, at least 0.75%, at least 1%, at least 1.25%, at least 1.5%, at least 1.75%, at least 2%, at least 2.25%, at least 2.5%, at least 2.75%, at least 3%, at least 4%, at least 5%, at least 10%, at least 15%, at least 20%, at least 25%, at least 30%, at least 35%, at least 40%, at least 45%, or at least 50% by weight or volume, based on the total weight or volume of the slurry. In some embodiments, the amount of each of the conductive agent and binder material is independently at most 0.1%, at most 0.25%, at most 0.5%, at most 0.75%, at most 1%, at most 1.25%, at most 1.5%, at most 1.75%, at most 2%, at most 2.25%, at most 2.5%, at most 2.75%, at most 3%, at most 4%, at most 5%, at most 10%, at most 15%, at most 20%, at most 25%, at most 30%, at most 35%, at most 40%, at most 45%, or at most 50% by weight or volume, based on the total weight or volume of the slurry.

In some embodiments, the amount of the conductive agent is from about 0.02% to about 1%, from about 0.02% to about 0.5%, from about 0.02% to about 0.25%, from about 0.05% to about 1%, from about 0.05% to about 0.5%, from about 0.12% to about 1.25%, from about 0.12% to about 1%, from about 0.25% to about 2.5%, from about 0.5% to about 2.5%, from about 0.5% to about 2%, from about 1% to about 3%, from about 1% to about 2.5%, from about 1% to about 2%, from about 1% to about 1.5%, from about 1.5% to about 3%, from about 1% to about 2.5%, from about 1.5% to about 3.5%, or from about 2.5% to about 5% by weight or volume, based on the total weight or volume of the slurry. In certain embodiments, the amount of the conductive agent is about 0.5%, about 0.75%, about 1%, about 1.25%, about 1.5%, about 1.75%, about 2%, about 2.25%, about 2.5%, about 2.75%, or about 3% by weight or volume, based on the total weight or volume of the slurry.

In certain embodiments, the amount of the binder material is from about 0.5% to about 5%, from about 0.5% to about 2.5%, from about 1% to about 5%, from about 1% to about 4%, from about 1% to about 3%, from about 1% to about 2%, from about 1.5% to about 3%, from about 1.5% to about 2%, from about 2.5% to about 5%, from about 2.5% to about 4%, from about 2.5% to about 3%, from about 3.5% to about 8%, from about 3.5% to about 7%, from about 3.5% to about 6%, from about 3.5% to about 5%, from about 3.7% to about 7.5%, from about 5% to about 10%, from about 7.5% to about 12.5%, from about 10% to about 20%, or from about 17.5% to about 25% by weight or volume, based on the total weight or volume of the slurry. In some embodiments, the amount of the binder material is about 0.5%, about 0.75%, about 1%, about 1.25%, about 1.5%, about 1.75%, about 2%, about 2.25%, about 2.5%, about 2.75%, about 3%, about 3.5%, about 4%, about 4.5%, or about 5% by weight or volume, based on the total weight or volume of the slurry.

The slurry is prepared by mixing the anode active material with auxiliary materials such as conductive agent and binder material in a solvent. The mixing process aims to achieve a uniform dispersion of the particles of the anode active material, conductive agent and binder material in a solvent.

The solvent used in the slurry can be any polar organic solvent. The polar organic solvent can be any polar protic or polar aprotic organic solvent having a dielectric constant of greater than 15, greater than 20, greater than 25, greater than 30, greater than 35, greater than 40, or greater than 45. Some non-limiting examples of the polar protic organic solvent include alcohols such as benzyl alcohol, ethylene glycol, n-butanol, isopropanol, n-propanol, ethanol, and methanol. Some non-limiting examples of the polar aprotic organic solvent include ketone solvents, acetate solvents, ester solvents such as propionate esters, and carbonate solvents. Some non-limiting examples of the ketone solvents include methyl propyl ketone, methyl isobutyl ketone, ethyl propyl ketone, diisobutyl ketone, acetophenone, N-methyl-2-pyrrolidone (NMP), acetone, and the like. Some non-limiting examples of the acetate solvents include ethyl acetate, butyl acetate, isobutyl acetate, and the like. Some non-limiting examples of the propionate esters such as n-butyl propionate, n-pentyl propionate and ethylene glycol monoethylether propionate are also suitable. Some non-limiting examples of the carbonate solvents comprise dimethyl carbonate, diethyl carbonate, ethylene carbonate, propylene carbonate, butylene carbonate, ethyl methyl carbonate, methyl propyl carbonate, and the like. Other non-limiting examples of the polar aprotic organic solvent include tetrahydrofuran, dimethylformamide, acetonitrile, and dimethyl sulfoxide. In some embodiments, the solvent used in the slurry comprises a polar protic solvent, a polar aprotic solvent, or a combination thereof.

An aqueous solvent can also be used for producing the slurry. Transition to an aqueous-based process may be desirable to reduce emissions of volatile organic compound, and increase processing efficiency. In certain embodiments, the solvent used in the slurry is a solution containing water as the major component and a volatile solvent, such as alcohols, lower aliphatic ketones, lower alkyl acetates or the like, as the minor component in addition to water. In some embodiments, the amount of water is at least 50%, at least 55%, at least 60%, at least 65%, at least 70%, at least 75%, at least 80%, at least 85%, at least 90%, or at least 95% to the total amount of water and solvents other than water. In certain embodiments, the amount of water is at most 55%, at most 60%, at most 65%, at most 70%, at most 75%, at most 80%, at most 85%, at most 90%, or at most 95% to the total amount of water and solvents other than water. In some embodiments, the solvent consists solely of water, that is, the proportion of water in the solvent is 100 vol. %.

Any water-miscible solvents can be used as the minor component. Some non-limiting examples of the minor component (i.e., solvents other than water) include alcohols, lower aliphatic ketones, lower alkyl acetates and combinations thereof. Some non-limiting examples of the alcohol include $C_1$-$C_4$ alcohols, such as methanol, ethanol, isopropanol, n-propanol, butanol, and combinations thereof. Some non-limiting examples of the lower aliphatic ketones include acetone, dimethyl ketone, and methyl ethyl ketone. Some non-limiting examples of the lower alkyl acetates include ethyl acetate, isopropyl acetate, and propyl acetate.

In some embodiments, the volatile solvent or minor component is methyl ethyl ketone, ethanol, ethyl acetate or a combination thereof.

In certain embodiments, the solvent is a mixture of water and one or more water-miscible minor components. In some embodiments, the solvent is a mixture of water and a minor component selected from methanol, ethanol, isopropanol, n-propanol, t-butanol, n-butanol, and combinations thereof. In certain embodiments, the volume ratio of water and the minor component is from about 51:49 to about 100:1.

In some embodiments, the solvent is water. Since the composition of the slurry does not contain any organic solvent, expensive, restrictive and complicated handling of organic solvents is avoided during manufacture of slurries. Some non-limiting examples of water include tap water, bottled water, purified water, pure water, distilled water, de-ionized water, $D_2O$, or a combination thereof. In some embodiments, the solvent is de-ionized water.

In certain embodiments, the solvent comprises a volatile solvent, a nonvolatile solvent or a combination thereof. In some embodiments, the solvent comprises a mixture of NMP and at least one alcohol solvent selected from the group consisting of n-butanol, isopropanol, n-propanol, ethanol, and methanol. In further embodiments, the solvent comprises a mixture of NMP and ethanol or a mixture of NMP and isopropanol. In some embodiments, the solvent comprises a mixture of NMP and at least one ketone solvent selected from the group consisting of methyl propyl ketone, methyl isobutyl ketone, ethyl propyl ketone, diisobutyl ketone, acetophenone, and acetone. In further embodiments, the solvent comprises a mixture of NMP and acetone. In certain embodiments, the solvent comprises a mixture of NMP and at least one carbonate solvent selected from the group consisting of dimethyl carbonate, diethyl carbonate, ethylene carbonate, propylene carbonate, butylene carbonate, ethyl methyl carbonate, and methyl propyl carbonate. In further embodiments, the solvent comprises a mixture of NMP and dimethyl carbonate. In other embodiments, the solvent comprises a mixture of NMP and water, water and ethanol, or water and dimethyl carbonate. In certain embodiments, the volatile solvent is the major component which provides slurry with rapid drying properties. In some embodiments, the volume ratio of volatile solvent and the nonvolatile solvent is from about 51:49 to about 100:1.

A slurry having a solvent with high vapor pressure can be dried at a higher rate. In some embodiments, the vapor pressure of the solvent at a temperature from about 60° C. to 90° C. is independently from about 0.01 kPa to about 200 kPa, from about 0.01 kPa to about 150 kPa, from about 0.01 kPa to about 100 kPa, from about 0.1 kPa to about 200 kPa, from about 0.1 kPa to about 150 kPa, from about 0.1 kPa to about 100 kPa, from about 0.3 kPa to about 200 kPa, from about 0.3 kPa to about 150 kPa, from about 0.3 kPa to about 100 kPa, from about 0.3 kPa to about 80 kPa, from about 0.3 kPa to about 60 kPa, from about 0.3 kPa to about 40 kPa, from about 0.3 kPa to about 20 kPa, from about 10 kPa to about 200 kPa, from about 10 kPa to about 150 kPa, from about 10 kPa to about 100 kPa, from about 10 kPa to about 80 kPa, from about 10 kPa to about 60 kPa, or from about 10 kPa to about 40 kPa.

In certain embodiments, the vapor pressure of the solvent at a temperature from about 60° C. to 90° C. is independently less than 200 kPa, less than 150 kPa, less than 100 kPa, less than 90 kPa, less than 80 kPa, less than 70 kPa, less than 60 kPa, less than 50 kPa, less than 40 kPa, less than 30 kPa, less than 20 kPa, less than 10 kPa, less than 5 kPa, less than 1 kPa, less than 0.5 kPa, less than 0.3 kPa, or less than 0.1 kPa. In some embodiments, the vapor pressure of the solvent at a temperature from about 60° C. to 90° C. is independently at least 0.01 kPa, at least 0.05 kPa, at least 0.1 kPa, at least 0.5 kPa, at least 1 kPa, at least 5 kPa, at least 10 kPa, at least 20 kPa, at least 30 kPa, at least 40 kPa, at least 50 kPa, at least 60 kPa, at least 70 kPa, at least 80 kPa, at least 90 kPa, at least 100 kPa, at least 150 kPa, or at least 200 kPa.

A slurry having a solvent with a low boiling point can be dried at a faster rate. In some embodiments, the boiling point of the solvent is from about 40° C. to about 250° C., from about 40° C. to about 200° C., from about 40° C. to about 150° C., from about 40° C. to about 100° C., from about 40° C. to about 90° C., from about 40° C. to about 80° C., from about 40° C. to about 70° C., from about 40° C. to about 60° C., from about 60° C. to about 100° C., from about 60° C. to about 90° C., from about 60° C. to about 80° C., or from about 60° C. to about 70° C. In certain embodiments, the boiling point of the solvent is less than 250° C., less than 200° C., less than 150° C., less than 100° C., less than 90° C., less than 80° C., less than 70° C., less than 60° C., or less than 50° C. In some embodiments, the boiling point of the solvent is at least 40° C., at least 50° C., at least 60° C., at least 70° C., at least 80° C., at least 90° C., at least 100° C., at least 150° C., or at least 200° C.

In some embodiments, the solvent is present in an amount from about 20% to about 80%, from about 20% to about 70%, from about 20% to about 60%, from about 20% to about 50%, from about 20% to about 40%, from about 30% to 50%, from about 30% to about 40%, from about 40% to about 70%, from about 40% to about 60%, from about 40% to about 50%, from about 50% to about 80%, from about 50% to about 70%, from about 50% to about 60%, from about 25% to about 60%, from about 25% to about 50%, from about 25% to about 45%, from about 45% to about 60%, from about 45% to about 55%, or from about 45% to about 50% by weight or volume, based on the total weight or volume of the slurry.

In certain embodiments, the solvent is present in an amount less than 80%, less than 70%, less than 60%, less than 55%, less than 50%, less than 45%, less than 40%, less than 35%, less than 30%, less than 25%, or less than 20% by weight or volume, based on the total weight or volume of the slurry. In some embodiments, the solvent is present in an amount at least 15%, at least 20%, at least 25%, at least 30%, at least 35%, at least 40%, at least 45%, at least 50%, at least 55%, at least 60%, at least 70%, or at least 80% by weight or volume, based on the total weight or volume of the slurry. In certain embodiments, the amount of solvent is about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60% by weight or volume, based on the total weight or volume of the slurry.

In some embodiments, the weight percentage of solvent is more than total weight percentage of anode active material, conductive agent and binder material. In certain embodiments, the weight percentage of solvent is less than total weight percentage of anode active material, conductive agent and binder material. In some embodiments, the weight percentage of solvent is equal to the total weight percentage of anode active material, conductive agent and binder material.

In certain embodiments, the weight percentage of anode active material is more than the weight percentage of conductive agent. In some embodiments, the ratio of the weight percentage of anode active material to the weight percentage of conductive agent in the slurry is from about 1 to about 100, from about 1 to about 80, from about 1 to about 60, from about 1 to about 50, from about 10 to about 50, from about 10 to about 40, from about 10 to about 35, from about 10 to about 30, from about 10 to about 25, from about 10 to about 20, from about 20 to about 60, from about 20 to about 50, from about 20 to about 45, from about 20 to about 40, from about 30 to about 50, from about 30 to about 40, from about 40 to about 60, from about 40 to about 50, from about 20 to about 30, or from about 20 to about 25. In some embodiments, the ratio of the weight percentage of anode active material to the weight percentage of conductive agent in the slurry is less than 100, less than 80, less than 60, less than 50, less than 45, less than 40, less than 35, less than 30, less than 25, less than 20, or less than 10. In certain embodiments, the ratio of the weight percentage of anode active material to the weight percentage of conductive agent in the slurry is at least 1, at least 10, at least 20, at least 25, at least 30, at least 35, at least 40, at least 45, at least 50, at least 55, at least 60, or at least 80. In some embodiments, the ratio of the weight percentage of anode active material to the weight percentage of conductive agent in the slurry is about 15, about 16, about 17, about 18, about 19, about 20, about 21, about 22, about 23, about 24, about 25, about 26, about 27, about 28, about 29, or about 30.

In certain embodiments, the weight percentage of anode active material is more than the weight percentage of binder material. In some embodiments, the ratio of the weight percentage of anode active material to the weight percentage of binder material in the slurry is from about 1 to about 100, from about 1 to about 80, from about 1 to about 60, from about 1 to about 50, from about 5 to about 50, from about 5 to about 45, from about 5 to about 40, from about 5 to about 35, from about 5 to about 30, from about 5 to about 25, from about 5 to about 20, from about 5 to about 15, from about 15 to about 50, from about 15 to about 40, from about 15 to about 35, from about 15 to about 30, from about 15 to about 25, or from about 15 to about 20. In certain embodiments, the ratio of the weight percentage of anode active material to the weight percentage of binder material in the slurry is less than 100, less than 80, less than 60, less than 50, less than 45, less than 40, less than 35, less than 30, less than 25, less than 20, less than 15, or less than 10. In some embodiments, the ratio of the weight percentage of anode active material to the weight percentage of binder material in the slurry is at least 5, at least 10, at least 15, at least 20, at least 25, at least 30, at least 35, at least 40, at least 45, at least 50, at least 60, at least 70, or at least 80. In certain embodiments, the ratio of the weight percentage of anode active material to the weight percentage of binder material in the slurry is about 15, about 16, about 17, about 18, about 19, about 20, about 21, about 22, about 23, about 24, about 25, about 26, about 27, about 28, about 29, about 30, about 31, about 32, about 33, about 34, about 35, about 36, about 37, about 38, about 39, or about 40.

In some embodiments, the weight percentage of binder material is more than the weight percentage of conductive agent. In certain embodiments, the weight percentage of binder material is less than the weight percentage of conductive agent. In some embodiments, the weight percentage of binder material is equal to the weight percentage of conductive agent. In certain embodiments, the ratio of the weight percentage of binder material to the weight percentage of conductive agent is from about 0.1 to about 5, from about 0.5 to about 4.5, from about 0.5 to about 4, from about 0.5 to about 3.5, from about 0.5 to about 3, from about 0.5 to about 2.5, from about 0.5 to about 2, from about 0.5 to about 1.5, from about 0.5 to about 1, from about 1 to about 5, from about 1 to about 4, from about 1 to about 3, from about 1 to about 2, or from about 1 to about 1.5. In some embodiments, the ratio of the weight percentage of binder material to the weight percentage of conductive agent is less than 5, less than 4.5, less than 4, less than 3.5, less than 3, less than 2.5, less than 2, less than 1.5, less than 1, or less than 0.5. In certain embodiments, the ratio of the weight percentage of binder material to the weight percentage of conductive agent is at least 0.5, at least 1, at least 1.5, at least 2, at least 2.5, at least 3, at least 3.5, at least 4, or at least 4.5.

Electrode coating layers are typically prepared by coating a suspension of particles containing an anode active material, conductive agent and binder material onto a support and allowing the suspension to dry into a thin film. It is generally desired that the anode slurry can dry as quickly as possible. This improves productivity of a coating system, thus reducing overall processing time. Generally, the anode slurry comprises an anode active material as a main component. One method of preparing a rapid-dry slurry is to use anode active material having large particle size. Particle size distribution plays a crucial role in determining specific surface area of the anode active material. The larger surface area allows a greater interaction with the solvent, which results in slower drying.

A bimodal particle distribution can enhance packing efficiency. In some embodiments, the anode active material comprises a mixture of particles of two size distributions where a particle size of a peak of a second distribution being greater than a particle size of a peak of a first distribution. In certain embodiments, a first peak of the bimodal distribution may be between about 5 μm and about 20 μm, and a second peak of the bimodal distribution may be between about 20 μm and about 40 μm. In some embodiments, the particle size distribution of the anode active material is bimodal with a first peak at about 10 μm and a second peak at about 25 μm. The packing density increases when the small particles fill the interstices between the larger particles.

In certain embodiments, the difference between the diameters at the two peaks of the distribution is less than or equal to 80%, less than or equal to 60%, less than or equal to 50%, or less than or equal to 35%.

In some embodiments, the weight ratio of the anode active material having a particle size of a peak of a second distribution to the anode active material having a particle size of a peak of a first distribution is from 3:1 to 5:1. In certain embodiments, the weight ratio of the anode active material having a particle size of a peak of a second distribution to the anode active material having a particle size of a peak of a first distribution is 5:1, 4:1 or 3:1.

A thorough mixing of the slurries is critical since agglomerated particles or inhomogeneous distribution of the components in the slurries will affect the coating and drying operations and eventually the performance and quality of the batteries. The slurry can be homogenized by a homogenizer. The homogenizing step reduces or eliminates the potential aggregation of the anode active material and the conductive agent and enhances dispersion of each ingredient in the slurry. Any equipment that can homogenize the slurry can be used. In some embodiments, the homogenizer is a stirring mixer, a blender, a mill, an ultrasonicator, a rotor-stator homogenizer, or a high pressure homogenizer.

In some embodiments, the homogenizer is an ultrasonicator. Any ultrasonicator that can apply ultrasound energy to agitate and disperse particles in a sample can be used herein. In some embodiments, the ultrasonicator is a probe-type ultrasonicator or an ultrasonic flow cell.

After homogenization, a uniform slurry is obtained. The viscosity of the slurry affects the quality of the ultimate coating. If the viscosity of the slurry is too high, it may result in the formation of a non-uniform coating. Further, if the viscosity of the slurry is too low, a satisfactory film is hardly obtainable.

Particle agglomeration increases the drying time of the slurry because solvent may be trapped within the agglomerates, thereby making evaporation of solvent more difficult. Using larger anode active material particles reduces the occurrence of particle agglomeration.

In some embodiments, the pH of the anode slurry is from about 7 to about 10, from about 7 to about 9.5, from about 7 to about 9, from about 7 to about 8.5, from about 7 to about 8, from about 7 to about 7.5, from about 7 to about 7.3, from about 7.2 to about 9, from about 7.7 to about 9, from about 7.5 to about 10, from about 7.5 to about 9, from about 7.5 to about 8, from about 7.3 to about 8.5, from about 7.5 to about 8.5, from about 8 to about 11, from about 8 to about 10.5, from about 8 to about 10, from about 8 to about 9.5, from about 8 to about 9, from about 8 to about 8.5, or from about 9 to about 10. In certain embodiments, the pH of the anode slurry is less than 12, less than 11.5, less than 11, less than 10.5, less than 10, less than 9.5, less than 9, less than 8.5, less than 8, less than 7.9, less than 7.8, less than 7.7, less than 7.6, less than 7.5, less than 7.4, less than 7.3, less than 7.2, less than 7.1, or less than 7. In some embodiments, the pH of the anode slurry is at least 7, at least 7.1, at least 7.2, at least 7.3, at least 7.4, at least 7.5, at least 7.6, at least 7.7, at least 7.8, at least 7.9, at least 8, at least 8.5, at least 9, at least 9.5, or at least 10. In certain embodiments, the pH of the anode slurry is about 7, about 7.5, about 8, about 8.5, about 9, about 9.5, or about 10.

In some embodiment, the anode slurry has a viscosity from about 500 mPa·s to about 6,000 mPa·s, from about 500 mPa·s to about 5,500 mPa·s, from about 500 mPa·s to about 5,000 mPa·s, from about 500 mPa·s to about 4,500 mPa·s, from about 500 mPa·s to about 4,000 mPa·s, from about 500 mPa·s to about 3,500 mPa·s, from about 500 mPa·s to about 3,000 mPa·s, from about 1,000 mPa·s to about 6,000 mPa·s, from about 1,000 mPa·s to about 5,500 mPa·s, from about 1,000 mPa·s to about 5,000 mPa·s, from about 1,000 mPa·s to about 4,500 mPa·s, from about 1,000 mPa·s to about 4,000 mPa·s, from about 1,000 mPa·s to about 3,500 mPa·s, from about 1,000 mPa·s to about 3,000 mPa·s, from about 1,000 mPa·s to about 2,500 mPa·s, from about 1,000 mPa·s to about 2,000 mPa·s, from about 1,500 mPa·s to about 4,000 mPa·s, from about 1,500 mPa·s to about 3,500 mPa·s, from about 1,500 mPa·s to about 3,000 mPa·s, from about 2,000 mPa·s to about 4,000 mPa·s, from about 2,000 mPa·s to about 3,500 mPa·s, or from about 2,000 mPa·s to about 3,000 mPa·s.

In certain embodiments, the anode slurry has a viscosity less than 6,000 mPa·s, less than 5,500 mPa·s, less than 5,000 mPa·s, less than 4,500 mPa·s, less than 4,000 mPa·s, less than 3,500 mPa·s, less than 3,000 mPa·s, less than 2,500 mPa·s, less than 2,000 mPa·s, or less than 1,000 mPa·s. In some embodiments, the anode slurry has viscosity more than 1,000 mPa·s, more than 1,500 mPa·s, more than 2,000 mPa·s, more than 2,500 mPa·s, more than 3,000 mPa·s, more than 3,500 mPa·s, more than 4,000 mPa·s, more than 4,500 mPa·s, more than 5,000 mPa·s, or more than 5,500 mPa·s.

When the amount of the solid content in the slurry is low, drying time becomes longer due to a larger amount of solvent in the slurry. In some embodiments, the solid content of the anode slurry is from about 20% to about 80%, from about 20% to about 70%, from about 20% to about 60%, from about 20% to about 50%, from about 20% to about 40%, from about 30% to about 70%, from about 30% to about 60%, from about 30% to about 50%, from about 30% to about 40%, from about 40% to about 70%, from about 40% to about 60%, from about 40% to about 50%, from about 25% to about 60%, from about 35% to about 60%, or from about 45% to about 60% by weight, based on the total weight of the anode slurry.

In certain embodiments, the solid content of the anode slurry is less than 80%, less than 70%, less than 60%, less than 55%, less than 50%, less than 45%, less than 40%, less than 35%, less than 30%, or less than 25% by weight, based on the total weight of the anode slurry. In some embodiments, the solid content of the anode slurry is at least 20%, at least 25%, at least 30%, at least 35%, at least 40%, at least 45%, at least 50%, at least 55%, or at least 60% by weight, based on the total weight of the anode slurry. In certain embodiments, the solid content of the anode slurry is about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, or about 60% by weight, based on the total weight of the anode slurry.

The homogenized slurry can be applied on a current collector to form a coated film on the current collector. The current collector acts to collect electrons generated by electrochemical reactions of the active battery electrode material or to supply electrons required for the electrochemical reactions. In some embodiments, each of the current collectors of the positive and negative electrodes, which can be in the form of a foil, sheet or film, is independently stainless steel, titanium, nickel, aluminum, copper or electrically-conductive resin. In certain embodiments, the current collector of the positive electrode is an aluminum thin film. In some embodiments, the current collector of the negative electrode is a copper thin film. In certain embodiments, the surface of the current collector is not pre-treated.

In some embodiments, the current collector has a thickness from about 6 μm to about 100 μm since thickness will affect the volume occupied by the current collector within a battery and the amount of the active battery electrode material and hence the capacity in the battery.

In certain embodiments, the coating process is performed using a doctor blade coater, a slot-die coater, a transfer coater, a spray coater, a roll coater, a dip coater, or a curtain coater. In some embodiments, the thickness of the coated film on the current collector is from about 10 μm to about 300 μm, or from about 20 μm to about 100 μm.

After applying the homogenized slurry on a current collector, the coated film on the current collector can be dried by a dryer to obtain the battery electrode. Any dryer that can dry the coated film on the current collector can be used herein. Some non-limiting examples of the dryer are a batch drying oven, a box-type drying oven, a hot plate, a conveyor drying oven, and a microwave drying oven. Some non-limiting examples of the conveyor drying oven include a conveyor hot air drying oven, a conveyor resistance drying oven, a conveyor inductive drying oven, and a conveyor microwave drying oven.

In some embodiments, the conveyor drying oven for drying the coated film on the current collector includes one or more heating sections, wherein each of the heating sections is individually temperature controlled, and wherein each of the heating sections may include independently controlled heating zones.

In certain embodiments, the conveyor drying oven comprises a first heating section positioned on one side of the conveyor and a second heating section positioned on an opposing side of the conveyor from the first heating section, wherein each of the first and second heating sections independently comprises one or more heating elements and a temperature control system connected to the heating elements of the first heating section and the second heating section in a manner to monitor and selectively control the temperature of each heating section.

In some embodiments, the anode slurry comprises at least one solvent having a boiling point below 150° C. The choice and amount of solvent affects the curing conditions. Selection of solvent with a lower boiling point enables faster drying at lower temperature. A lower temperature can avoid crack or embrittlement of an anode electrode layer. In some embodiments, the coated film on the current collector can be dried at a temperature from about 45° C. to about 100° C., from about 50° C. to about 100° C., from about 55° C. to about 100° C., from about 50° C. to about 90° C., from about 50° C. to about 80° C., from about 55° C. to about 80° C., from about 55° C. to about 75° C., from about 55° C. to about 70° C., from about 50° C. to about 80° C., from about 50° C. to about 70° C., from about 60° C. to about 100° C., from about 60° C. to about 90° C., from about 60° C. to about 80° C., from about 45° C. to about 90° C., from about 45° C. to about 80° C., or from about 45° C. to about 70° C. In certain embodiments, the coated film on the current collector can be dried at a temperature less than 100° C., less than 95° C., less than 90° C., less than 85° C., less than 80° C., less than 75° C., less than 70° C., less than 65° C., less than 60° C., less than 55° C., less than 50° C., less than 45° C., or less than 40° C. In some embodiments, the coated film on the current collector can be dried at a temperature higher than 40° C., higher than 45° C., higher than 50° C., higher than 55° C., higher than 60° C., higher than 65° C., higher than 70° C., higher than 75° C., higher than 80° C., higher than 85° C., or higher than 90° C.

The coated film should not be dried under windy conditions which may cause non-uniform slurry distribution and in turn affect the quality of the coated electrode. In some embodiments, the coated film on the current collector can be dried under still air conditions. In certain embodiments, the coated film on the current collector can be dried under an environment having a wind speed between 0.2 m/s and 1 m/s, or between 0.2 m/s and 0.7 m/s. In further embodiments, the wind speed is less than 0.7 m/s, less than 0.5 m/s, less than 0.4 m/s, less than 0.3 m/s, less than 0.2 m/s, or less than 0.1 m/s. In certain embodiments, the wind speed is 0 m/s.

During drying at low or moderate humidity, solvent leaves a coating more rapidly, thereby permitting faster drying at lower temperatures. In some embodiments, the coated film on the current collector can be dried under an environment having a relative humidity from about 0% to about 60%, from about 10% to about 50%, from about 20% to about 50%, from about 20% to about 40%, from about 25% to about 40%, from about 15% to about 50%, from about 15% to about 40%, from about 15% to about 30%, from about 15% to about 25%, or from about 20% to about 30%. In certain embodiments, the relative humidity is less than 50%, less than 45%, less than 40%, less than 35%, less than 30%, less than 25%, less than 20%, less than 15%, or less than 10%.

The anode slurry disclosed herein can be dried in a short period of time. In some embodiments, the coated film can be dried for a time period from about 1 minute to about 15 minutes, from about 1 minute to about 10 minutes, from about 1 minute to about 8 minutes, from about 1 minute to about 5 minutes, from about 1 minute to about 4 minutes, from about 1 minute to about 3 minutes, from about 1 minute to about 2 minutes, from about 1.5 minutes to about 5 minutes, from about 1.5 minutes to about 4 minutes, from about 1.5 minutes to about 3 minutes, from about 2 minutes to about 10 minutes, from about 2 minutes to about 5 minutes, from about 2 minutes to about 4 minutes, from about 2 minutes to about 3 minutes, from about 3 minutes to about 5 minutes, from about 3 minutes to about 4 minutes, from about 4 minutes to about 5 minutes, from about 2.5 minutes to about 5 minutes, from about 2.5 minutes to about 4 minutes, or from about 3.5 minutes to about 5 minutes. In certain embodiments, the coated film can be dried for a time period of less than 12 hours, less than 8 hours, less than 4 hours, less than 2 hours, less than 1 hour, less than 45 minutes, less than 30 minutes, less than 15 minutes, less than 13 minutes, less than 10 minutes, less than 9 minutes, less than 8 minutes, less than 7 minutes, less than 6 minutes, less than 5 minutes, less than 4.5 minutes, less than 4 minutes, less than 3.5 minutes, less than 3 minutes, less than 2.5 minutes, less than 2 minutes, or less than 1.5 minutes. If the drying rate is too slow, manufacturing efficiency suffers.

After drying, solvent has been removed from the coated film. Comparison of the mass of the coated electrode dried for a predetermined time to a coated electrode dried for a prolonged period of time is used as a measurement of the extent of drying. During the prolonged period of drying, the amount of solvent that can be removed from the coated electrode dried for a predetermined time is less than 2 percent by weight, based on total weight of the coated electrode involving drying for a predetermined time period.

After the coated film on the current collector is dried, the battery electrode is formed. In some embodiments, the battery electrode is compressed mechanically in order to enhance the density of the electrode.

In another aspect, provided herein is a lithium-ion battery comprising a cathode, an anode and a separator interposed between the cathode and the anode, wherein at least one of the anode is the negative electrode prepared by the method disclosed herein.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The wind speed was determined by measuring the wind speed at a position 1 cm above the top surface of the coated film by means of a commercially available anemometer.

The particle size was analyzed using a MicroBrook 2000LD particle size analyzer (obtained from Brookhaven Instruments Cooperation, US).

The slurry viscosity was determined with a NDJ-5S viscometer (obtained from Shanghai Hengping Scientific Instrument Co., China).

Example 1

A) Preparation of Negative Electrode Slurry

A particulate graphite anode active material (AGP-1) (obtained from Ruifute Technology Ltd., Shenzhen, Guangdong, China) had a particle size D50 of about 19 μm. A negative electrode slurry was prepared by mixing 90 wt. % graphite anode active material, 5 wt. % carbon black and 5 wt. % polyacrylonitrile in a mixed solvent containing 50 wt. % deionized water and 50 wt. % acetone (purity of ≥99%, Sigma-Aldrich, USA) to form a slurry having a solid content of 50 wt. %. The slurry was homogenized by a planetary stirring mixer. The viscosity of the negative electrode slurry was 985 mPa·s.

B) Preparation of Negative Electrode

The slurry was coated onto both sides of a copper foil having a thickness of 9 μm using a transfer coater (ZY-TSF6-6518, obtained from Jin Fan Zhanyu New Energy Technology Co. Ltd., China) with a gap width of 100 μm. The coated films on the copper foil were dried at 75° C. for about 3 minutes by a 24-meter-long conveyor hot air drying oven (TH-1A, obtained from Nanjing Tonghao Drying Equipment Co. Ltd., China) operated at a conveyor speed of about 8 meters/minute to obtain a negative electrode. A wind speed between 0.1 m/s and 0.4 m/s inside the drying oven was detected. The humidity inside the oven was 20-40%.

C) Preparation of Positive Electrode Slurry

A positive electrode slurry was prepared by mixing 92 wt. % $LiMn_2O_4$ cathode active material (obtained from Hua-Guan HengYuan LiTech Co. Ltd., Qingdao, China), 4 wt. % carbon black (SuperP; obtained from Timcal Ltd, Bodio, Switzerland) as a conductive agent, and 4 wt. % polyvinylidene fluoride (PVDF; Solef® 5130, obtained from Solvay S.A., Belgium) as a binder, which were dispersed in a mixed solvent containing 50 wt. % N-methyl-2-pyrrolidone (NMP; purity of ≥99%, Sigma-Aldrich, USA) and 50 wt. % acetone (purity of ≥99%, Sigma-Aldrich, USA) to form a slurry with a solid content of 50 wt. %. The slurry was homogenized by a planetary stirring mixer.

D) Preparation of Positive Electrode

The homogenized slurry was coated onto one side of an aluminum foil having a thickness of 20 μm as a current collector using a doctor blade coater with a gap width of 100 μm. The coated film on the aluminum foil was dried by an electrically heated conveyor oven at 85° C. at a conveyor speed of about 8 meters/minute. The drying time was about 3 minutes.

E) Assembling of Pouch-Type Battery

After drying, the resulting cathode film and anode film of Example 1 were used to prepare the cathode and anode respectively by cutting into individual electrode plates. A pouch cell was assembled by stacking the cathode and anode electrode plates alternatively and then packaged in a case made of an aluminum-plastic laminated film. The cathode and anode electrode plates were kept apart by separators and the case was pre-formed. An electrolyte was then filled into the case holding the packed electrodes in high-purity argon atmosphere with moisture and oxygen content <1 ppm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. After electrolyte filling, the pouch cells were vacuum sealed and then mechanically pressed using a punch tooling with standard square shape.

Electrochemical Measurements of Example 1

I) Nominal Capacity

The cell was tested galvanostatically at a current density of C/2 at 25° C. on a battery tester between 3.0 V and 4.2 V. The nominal capacity was about 9.8 Ah.

II) Cyclability Performance

The cyclability performance of the pouch cell was tested by charging and discharging at a constant current rate of 1 C between 3.0 V and 4.2 V. The anode slurry with quick drying capability improves processing efficiency without affecting the coating quality.

Example 2

A) Preparation of Negative Electrode Slurry

A particulate graphite anode active material (YXG-30) (obtained from Yanxin Graphite Products Co. Ltd., Qingdao, China) had a particle size D50 of about 30 μm. A negative electrode slurry was prepared by mixing 90 wt. % graphite anode active material, 5 wt. % carbon black and 5 wt. % polyvinylidene fluoride (PVDF; Solef® 5130, obtained from Solvay S.A., Belgium) in deionized water to form a slurry with a solid content of 50 wt. %. The slurry was homogenized by a planetary stirring mixer. The viscosity of the negative electrode slurry was 1,040 mPa·s.

B) Preparation of Negative Electrode

The slurry was coated onto both sides of a copper foil having a thickness of 9 μm using a transfer coater (ZY-TSF6-6518, obtained from Jin Fan Zhanyu New Energy Technology Co. Ltd., China) with a gap width of 100 μm. The coated films on the copper foil were dried at about 70° C. for about 1.6 minutes by a 24-meter-long conveyor hot air drying oven (TH-1A, obtained from Nanjing Tonghao Drying Equipment Co. Ltd., China) operated at a conveyor speed of about 15 meters/minute to obtain a negative electrode. A wind speed between 0.3 m/s and 0.5 m/s inside the drying oven was detected. The humidity inside the oven was 20-40%.

Example 3

A) Preparation of Negative Electrode Slurry

A particulate mesocarbon anode active material (CMB-H) (obtained from BTR New Energy Materials Inc., Shenzhen, China) had a particle size D50 of about 26 μm. A negative electrode slurry was prepared by mixing 93 wt. % mesocarbon anode active material, 4 wt. % carbon black and 3 wt. % water-soluble binder LA 133 (obtained from Chengdu Indigo Power Sources Co., Ltd., China) in a mixed solvent containing 50 wt. % deionized water and 50 wt. % ethanol (purity of ≥99%, Sigma-Aldrich, USA) to form a slurry with a solid content of 55 wt. %. The slurry was homogenized by a planetary stirring mixer. The viscosity of the negative electrode slurry was 850 mPa·s.

B) Preparation of Negative Electrode

The slurry was coated onto both sides of a copper foil having a thickness of 9 μm using a transfer coater (ZY-TSF6-6518, obtained from Jin Fan Zhanyu New Energy Technology Co. Ltd., China) with a gap width of 100 μm. The coated films on the copper foil were dried at about 85° C. for about 2.4 minutes by a 24-meter-long conveyor hot air drying oven (TH-1A, obtained from Nanjing Tonghao Drying Equipment Co. Ltd., China) operated at a conveyor speed of about 10 meters/minute to obtain a negative electrode. A wind speed between 0.2 m/s and 0.45 m/s inside the drying oven was detected. The humidity inside the oven was 20-40%.

Example 4

A) Preparation of Negative Electrode Slurry

A particulate graphite anode active material (model 818) (obtained from BTR New Energy Materials Inc., Shenzhen, China) had a particle size D50 of about 17 µm. A negative electrode slurry was prepared by mixing 91 wt. % graphite anode active material, 5 wt. % carbon black and 4 wt. % water-soluble binder (LA 133, Chengdu Indigo Power Sources Co., Ltd., China) in deionized water to form a slurry with a solid content of 50 wt. %. The slurry was homogenized by a planetary stirring mixer. The viscosity of the negative electrode slurry was 1,250 mPa·s.

B) Preparation of Negative Electrode

The slurry was coated onto both sides of a copper foil having a thickness of 9 µm using a transfer coater (ZY-TSF6-6518, obtained from Jin Fan Zhanyu New Energy Technology Co. Ltd., China) with a gap width of 100 µm. The coated films on the copper foil were dried at about 80° C. for about 3.6 minutes by a 24-meter-long conveyor hot air drying oven (TH-1A, obtained from Nanjing Tonghao Drying Equipment Co. Ltd., China) operated at a conveyor speed of about 6.7 meters/minute to obtain a negative electrode. A wind speed between 0.15 m/s and 0.4 m/s inside the drying oven was detected. The humidity inside the oven was 20-40%.

Example 5

Preparation of Negative Electrode

The anode of Example 5 was prepared by the method described in Example 1 except different parameters described in Tables 1 and 2 were used.

Preparation of Cathode for Examples 2-5

The cathodes of Examples 2-5 were prepared by the method described in Example 1.

Assembling of Pouch Cells for Examples 2-5

The pouch cells of Examples 2-5 were assembled by the method described in Example 1.

Electrochemical Measurements of Pouch Cells for Examples 2-5

Figure 2:
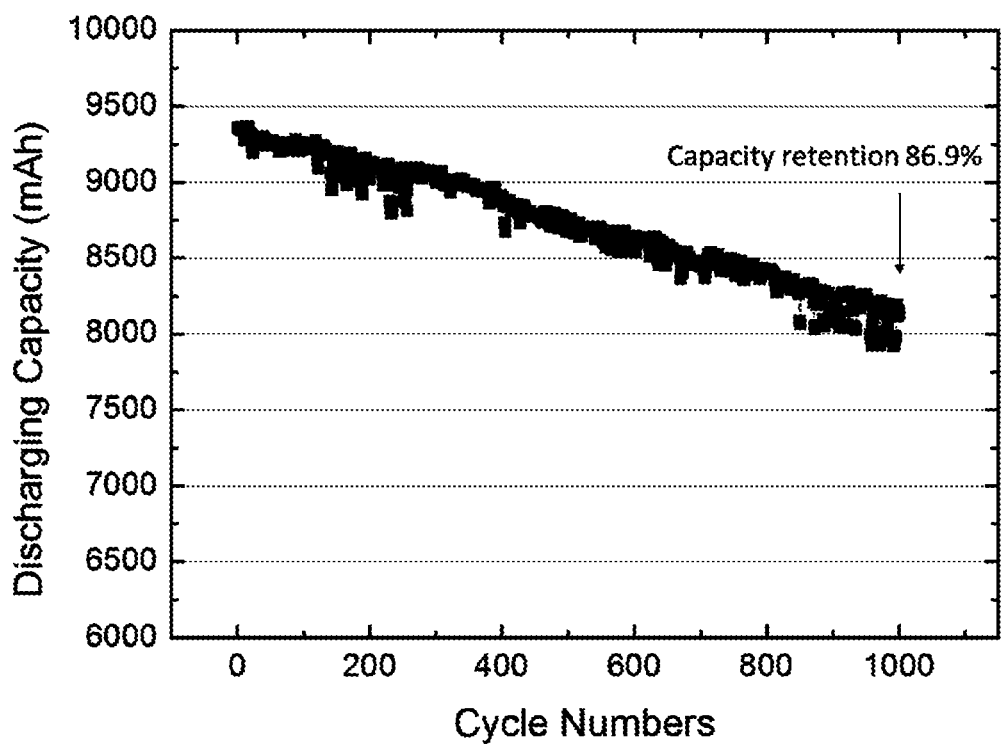
FIG. 2 depicts cycling performance for electrochemical cell containing cathode and anode prepared by Example 4.

The electrochemical performance of the pouch cells of Examples 2-5 was performed by the method described in Example 1. The test results of cyclability performance of Examples 3 and 4 are shown in FIGS. 1 and 2 respectively.

The formulations of the anode slurries of Examples 1-5 are shown in Table 1 below. The drying conditions of the coated anode films of Examples 1-5 are shown in Table 2 below. The electrochemical performance of the pouch cells of Examples 1-5 is shown in Table 3 below.

Comparative Example 1

A) Preparation of Negative Electrode Material

A particulate graphite anode active material (AGP-1) (obtained from Ruifute Technology Ltd., Shenzhen, Guangdong, China) had particle size D50 of about 19 µm. The particulate graphite anode active material was crushed by a jet mill (LNJ-6A, obtained from Mianyang Liuneng Powder Equipment Co., Ltd., Sichuan, China) for about 2.5 hours, followed by passing through a 1,250-mesh sieve to obtain an anode active material having a particle size D50 of about 7 µm.

B) Preparation of Negative Electrode Slurry

A negative electrode slurry was prepared in the same manner as in Example 1, except that the anode active material having a smaller particle size obtained by the method described in Comparative Example 1 was used. The viscosity of the negative electrode slurry was about 1,100 mPa·s.

C) Preparation of Negative Electrode

A negative electrode comprising negative electrode material obtained by method described in Comparative Example 1 was prepared in the same manner as in Example 1, except that the coated film on the copper foil was dried at 85° C. and the drying time was about 5.5 minutes.

It is clear that the negative electrode slurry of Example 1 dries more quickly than the negative electrode slurry of Comparative Example 1. The particle size of the anode active material influences the drying rate because as a particle becomes smaller, the surface area to volume ratio increases. The larger surface area allows a greater interaction with the solvent, resulting in slower drying. Therefore, the anode slurry of the present invention may lead to a more efficient drying process and improved productivity.

Comparative Example 2

A) Preparation of Negative Electrode Material

A particulate graphite anode active material (YXG-30) (obtained from Yanxin Graphite Products Co. Ltd., Qingdao, China) had a particle size D50 of about 30 µm. The particulate graphite anode active material was crushed in a ball mill using $ZrO_2$ milling balls (MSK-SFM-1, obtained from Shenzhen Kejing Star Technology Ltd., China) for about 1 hour, followed by passing through a 1,250-mesh sieve to obtain an anode active material having a particle size D50 of about 5.5 µm.

B) Preparation of Negative Electrode Slurry

A negative electrode slurry was prepared in the same manner as in Example 2, except that the anode active material having a smaller particle size obtained by the method described in Comparative Example 2 was used. The viscosity of the negative electrode slurry was about 1,300 mPa·s.

C) Preparation of Negative Electrode

A negative electrode comprising negative electrode material obtained by method described in Comparative Example 2 was prepared in the same manner as in Example 2, except that the coated film on the copper foil was dried at 85° C. and the drying time was about 7.8 minutes.

It is clear that the negative electrode slurry of Example 2 dries more quickly than the negative electrode slurry of Comparative Example 2. The particle size of the anode active material influences the drying rate because as a particle becomes smaller, the surface area to volume ratio increases. The larger surface area allows a greater interaction with the solvent, resulting in slower drying. Therefore, anode slurry of the present invention may lead to a more efficient drying process and improved productivity.

Preparation of Cathode Slurry for Comparative Examples 1-2

The cathode slurries of Comparative Examples 1-2 were prepared by the method described in Example 1.

Comparative Examples 3-5

The anode slurries of Comparative Examples 3-5 were prepared by the method described in Example 1 except different parameters described in Table 1 below were used.

The coated anode film of Comparative Examples 3-5 were dried by the method described in Example 2 except different drying conditions described in Table 2 below were used. The cathode slurries of Comparative Examples 3-5 were prepared by the method described in Example 1.

Assembling of Pouch Cells for Comparative Examples 1-5

The pouch cells of Comparative Examples 1-5 were assembled by the method described in Example 1.

Electrochemical Measurements of Pouch Cell for Comparative Examples 1-5

The electrochemical performance of the pouch cells of Comparative Examples 1-5 was performed by the method described in Example 1.

The formulations of the anode slurries of Comparative Examples 1-5 are shown in Table 1 below. The drying conditions of the coated anode films of Comparative Examples 1-5 are shown in Table 2 below. The electrochemical performance of the pouch cells of Comparative Examples 1-5 is shown in Table 3 below.

TABLE 3

Electrochemical performance of pouch cell

|  | Voltage range (V) used | No. of cycle | Capacity retention (%) |
|---|---|---|---|
| Example 1 | 3.0-4.2 | 1,000 | 91.7 |
| Example 2 | 3.0-4.2 | 1,000 | 90.4 |
| Example 3 | 3.0-4.2 | 1,000 | 88.2 |
| Example 4 | 3.0-4.2 | 1,000 | 86.9 |
| Example 5 | 1.8-3.0 | 1,000 | 95.8 |
| Comparative Example 1 | 3.0-4.2 | 1,000 | 86.7 |
| Comparative Example 2 | 3.0-4.2 | 1,000 | 85.9 |
| Comparative Example 3 | 3.0-4.2 | 1,000 | 83.4 |
| Comparative Example 4 | 3.0-4.2 | 1,000 | 84.1 |
| Comparative Example 5 | 3.0-4.2 | 1,000 | 77.4 |

While the invention has been described with respect to a limited number of embodiments, the specific features of one embodiment should not be attributed to other embodiments

TABLE 1

Formulation of anode slurry

|  | Anode active material | D50 of anode active material (μm) | Anode active material | Conductive agent | Binder material | Solvent | Vapor pressure of solvent (kPa) at its drying temperature | pH | Viscosity (mPa · s) | Solid content (wt. %) |
|---|---|---|---|---|---|---|---|---|---|---|
|  |  |  | Weight percentage of component (wt. %) |  |  |  |  |  |  |  |
| Example 1 | Graphite | 19 | 45 | 2.5 | 2.5 | Water + Acetone | 113 | 7.3 | 985 | 50 |
| Example 2 | Graphite | 30 | 45 | 2.5 | 2.5 | Water | 31.4 | 7.8 | 1,040 | 50 |
| Example 3 | Mesocarbon | 26 | 51.15 | 2.2 | 1.65 | Water + Ethanol | 96.2 | 8 | 850 | 55 |
| Example 4 | Graphite | 17 | 45.5 | 2.5 | 2 | Water | 46.4 | 7.7 | 1,250 | 50 |
| Example 5 | LTO | 25 | 45 | 2.5 | 2.5 | Water | 57.9 | 8.4 | 1,650 | 50 |
| Comparative Example 1 | Graphite | 7 | 45 | 2.5 | 2.5 | Water + Acetone | 151.5 | 8.1 | 1,100 | 50 |
| Comparative Example 2 | Graphite | 5.5 | 45 | 2.5 | 2.5 | Water | 57.9 | 7.9 | 1,300 | 50 |
| Comparative Example 3 | Graphite | 30 | 45 | 2.5 | 2.5 | NMP | 0.79 | / | 970 | 50 |
| Comparative Example 4 | Graphite | 70 | 45 | 2.5 | 2.5 | Water | 31.4 | 7.5 | 855 | 50 |
| Comparative Example 5 | Graphite | 30 | 45 | 2.5 | 2.5 | Water | 101 | 7.6 | 1,040 | 50 |

TABLE 2

Drying conditions of the coated anode film

|  | Temperature (° C.) | Wind speed (m/s) | Relative humidity (%) | Drying time (mins) |
|---|---|---|---|---|
| Example 1 | 75 | 0.1-0.4 | 20-40 | 3 |
| Example 2 | 70 | 0.3-0.5 | 20-40 | 1.6 |
| Example 3 | 85 | 0.2-0.45 | 20-40 | 2.4 |
| Example 4 | 80 | 0.15-0.4 | 20-40 | 3.6 |
| Example 5 | 85 | 0.2-0.5 | 20-40 | 4 |
| Comparative Example 1 | 85 | 0.1-0.4 | 20-40 | 5.5 |
| Comparative Example 2 | 85 | 0.3-0.5 | 20-40 | 7.8 |
| Comparative Example 3 | 70 | 0.3-0.5 | 20-40 | 11 |
| Comparative Example 4 | 70 | 0.3-0.5 | 20-40 | 1.6 |
| Comparative Example 5 | 100 | 0.3-0.5 | 20-40 | 1 | of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A lithium-ion battery anode slurry, comprising: an anode active material, a conductive agent, a binder material, and a solvent,
   wherein the anode active material has a particle size D50 in the range from about 10 μm to about 40 μm, and wherein the slurry coated onto a current collector having a wet film thickness of about 100 μm has a drying time of about 5 minutes or less under an environment having a temperature of about 60° C. to about 90° C. and a relative humidity of about 25% to about 40%;
   wherein the solvent is present in an amount from about 40% to about 60% by weight, based on the total weight of the slurry; and wherein the viscosity of the slurry is in the range from about 500 mPa·s to about 1,700 mPa·s.

2. The slurry of claim 1, wherein the anode active material has a D10 value of at least 3 μm.

3. The slurry of claim 1, wherein the anode active material has a D90 value of less than or equal to 70 μm.

4. The slurry of claim 1, wherein the anode active material is present in an amount from 35% to 70% by weight; wherein the conductive agent is present in an amount from 0.8% to 5% by weight; wherein the binder material is present in an amount from 0.5% to 6% by weight, and wherein all weight % values are based on the total weight of the slurry.

5. The slurry of claim 1, wherein the anode active material is selected from the group consisting of natural graphite particulate, synthetic graphite particulate, hard carbon, soft carbon, mesocarbon microbeads (MCMB), Sn particulate, $SnO_2$, SnO, $Li_4Ti_5Oi_2$ particulate, Si particulate, Si—C composite particulate, and combinations thereof.

6. The slurry of claim 1, wherein the conductive agent is selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof.

7. The slurry of claim 1, wherein the binder material is selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof.

8. The slurry of claim 7, wherein the salt of alginic acid comprises a cation selected from Na, Li, K, Ca, $NH_4$, Mg, Al, or a combination thereof.

9. The slurry of claim 1, wherein the solvent is selected from the group consisting of N-methyl-2-pyrrolidone, dimethylformamide, dimethyl sulfoxide, acetonitrile, butylene carbonate, propylene carbonate, ethyl bromide, tetrahydrofuran, dimethyl carbonate, diethyl carbonate, ethyl methyl, carbonate methyl propyl carbonate, ethylene carbonate, water, pure water, de-ionized water, distilled water, ethanol, isopropanol, methanol, acetone, n-propanol, t-butanol, and combinations thereof.

10. The slurry of claim 1, wherein the vapor pressure of the solvent is at least 15 kPa.

11. The slurry of claim 1, wherein the pH of the slurry is from about 7 to about 9.

12. The slurry of claim 1, wherein the coated slurry film is dried by a box oven, a conveyor oven, or a hot plate.

13. The slurry of claim 1, wherein the solvent has a boiling point of less than 140° C., less than 120° C., or less than 100° C.

14. The slurry of claim 1, wherein the ratio D90/D10 of the anode active material is from about 3 to about 10, or from about 5 to about 8.

15. The slurry of claim 1, wherein the slurry coated onto the current collector in the form of a film has a drying time of about 2.5 minutes or less.

16. The slurry of claim 1, wherein the particle size distribution of the anode active material is bimodal with a first peak at about 10 μm and a second peak at about 25 μm.

17. A negative electrode for a lithium-ion battery, the negative electrode comprising: an anode current collector; and an anode electrode layer dispersed on the anode current collector, wherein the anode electrode layer is formed using the anode slurry of claim 1.

18. A lithium-ion battery comprising: a cathode; an anode; and a separator interposed between the cathode and the anode, wherein at least one of the anode is the negative electrode of claim 17.

* * * * *